US006932846B2

(12) United States Patent
Bowden et al.

(10) Patent No.: US 6,932,846 B2
(45) Date of Patent: Aug. 23, 2005

(54) ALKALINE BATTERY

(75) Inventors: William L. Bowden, Nashua, NH (US);
Klaus Brandt, Wellesley, MA (US);
Paul A. Christian, Norton, MA (US);
Zhiping Jiang, Westford, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 10/796,724

(22) Filed: Mar. 9, 2004

(65) Prior Publication Data

US 2004/0175616 A1 Sep. 9, 2004

Related U.S. Application Data

(62) Division of application No. 09/988,297, filed on Nov. 19, 2001, now Pat. No. 6,783,893.

(51) Int. Cl.[7] ............................................. H01M 6/00
(52) U.S. Cl. ....................... 29/623.1; 429/224; 429/229
(58) Field of Search ......................... 29/623.1; 429/224, 429/229

(56) References Cited

U.S. PATENT DOCUMENTS

| 4,133,856 A | 1/1979 | Ikeda et al. |
| RE30,458 E | 12/1980 | Uetani et al. |
| 4,246,253 A | 1/1981 | Hunter |
| 4,312,930 A | 1/1982 | Hunter |
| 4,604,336 A | 8/1986 | Nardi |
| 4,904,552 A | 2/1990 | Furukawa et al. |
| 4,975,346 A | 12/1990 | Lecerf et al. |
| 5,114,804 A | 5/1992 | Stiles et al. |
| 5,425,932 A | 6/1995 | Tarascon |
| 5,596,278 A | 1/1997 | Lin et al. |
| 5,759,510 A | 6/1998 | Pillai |
| 5,955,052 A | 9/1999 | Padhi et al. |
| 5,997,839 A | 12/1999 | Pillai |
| 6,207,129 B1 | 3/2001 | Padhi et al. |
| 6,225,009 B1 | 5/2001 | Fleischer et al. |

FOREIGN PATENT DOCUMENTS

| EP | 0 728 701 A1 | 8/1996 |
| JP | 1-120767 | 5/1999 |

OTHER PUBLICATIONS

Ammundsen et al., "Mechanism of Proton Insertion and Characterization of the Proton Sites in Lithium Manganate Spinels," Chem. Mater., vol. 7, No. 11, pp. 2151–2160, (1995).
Bowden et al., "Manganese Dioxide for Alkaline Zinc Batteries: Why Electrolytic $MnO_2$?," ITE Letters on Batteries, New Technologies & Medicine, vol. 1, No. 6, (2000).
Dahn et al., "Thermal stability of $Li_xCoO_2$, $Li_xNiO_2$ and $\lambda-MnO_2$ and consequences for the safety of Li–ion cells," Solid State Ionics, vol. 69, Nos. 3–4, pp. 265–270, (1994).
David et al., "Structure Refinement of the Spinel–Related Phases $Li_2Mn_2O_4$ and $Li_{0.2}Mn_2O_4$," J. Solid State Chem., vol. 67, pp. 316–323, (1987).

(Continued)

Primary Examiner—Laura Weiner
(74) Attorney, Agent, or Firm—Fish & Richardson P.C.

(57) ABSTRACT

An alkaline battery includes a cathode including lambda-manganese dioxide, an anode including zinc, a separator between the cathode and the anode, and an alkaline electrolyte contacting the anode and the cathode.

15 Claims, 5 Drawing Sheets

OTHER PUBLICATIONS

Geronov et al., "Rechargeable Compact Li Cells with $Li_xCr_{0.9}V_{0.1}S_2$ and $Li_{1+x}V_3O_8$ Cathodes and Ether–Based Electrolytes," J. of the Electrochemical Soc., vol. 137, No. 11, pp. 3338–3344, (1990).

Giwa et al., "Lithium Primary Envelope Cells," 16th Intern. Seminar & Exhibition on Primary & Secondary Batteries, pp.Q1–11 (1999).

Hunter, J. C. and Tudron, F. B., "Nonaqueous Electrochemistry of Lambda $MnO_2$," Proc. Electrochem. Soc. vol. 85–4, pp. 444–451, (1985).

Hunter, James C., "Preparation of a New Crystal of Manganese Dioxide: $\lambda$–$MnO_2$," Journal of Solid State Chemistry, vol. 39, pp. 142–147, (1981).

Larcher et al., "Synthesis of $MnO_2$ Phases from $LiMn_2O_4$ in Aqueous Acidic Media," J. Electrochem. Soc., vol. 145, No. 10, pp. 3392–3400, (1998).

Manev, V. et al., "Rechargeable lithium battery with spinel–related $\lambda$–$MnO_2$1. Synthesis of $\lambda$–$MnO_2$ for battery applications," Journal of Power Sources, 43–44, pp. 551–559, (1993).

Mosbah et al., "Phases $Li_xMnO_2\lambda$ Rattachees au Type Spinelle," with English abstract, Bater. Res. Bull, vol. 18, pp. 1375–1381, (1938).

Patrice et al., "Understanding the second electron discharge plateau in $MnO_2$–based alkaline cells," ITE Letters on batteries, New Technologies and Medicine, vol. 2, No. 4, (2001).

Read et al., "Low Temperature Performance of $\lambda$–$MnO_2$ in Lithium Primary Batteries," Solid State Letters, vol. 4, No. 10, pp. A162–165, (2001).

Schilling et al., "Modification of the High–Rate Discharge Behavior of Zn–$MnO_2$ Alkaline Cells through the Addition of Metal Oxides to the Cathode," ITE Letters on Batteries, New Technologies & Medicine, vol. 2, No. 3, (2001).

Tarascon et al., "Chemical and electrochemical insertion of Na into the spinel $\lambda$–$MnO_2$ phase," Solid State Ionics, vol. 57, pp. 113–120, (1992).

Tarascon et al., "The Spinal Phase of $LiMn_2O_4$ as a Cathode in Secondary Lithium Cells," J. Electrochem. Soc., vol. 138, No. 10, pp. 2859–2864, (1991).

Tarascon, J. M. and Guyomard, D., "The $Li_{1+x}Mn_2O_4$/C Rocking–Chair System: A Review," Electrochimica Acta, vol. 38, No. 9, pp. 1221–1231, (1991).

Xia, Xi and Sun Weiwei, "The electrochemical performance of .lambda.–MnO2 in alkaline solution," abstract only, Dianyuan Jishu, 23 (Suppl.), pp. 74–76, (1999).

ALKALINE BATTERY

This application is a divisional (and claims the benefit of priority under 35 U.S.C. § 120) of U.S. application Ser. No. 09/988,297, filed Nov. 19, 2001 now U.S. Pat. No. 6,783,893.

TECHNICAL FIELD

This invention relates to an alkaline battery and a method of manufacturing an alkaline battery.

BACKGROUND

Batteries, such as alkaline batteries, are commonly used as energy sources. Generally, alkaline batteries have a cathode, an anode, a separator and an alkaline electrolyte solution. The cathode can include a cathode material (e.g., manganese dioxide or nickel oxyhydroxide), carbon particles that enhance the conductivity of the cathode, and a binder. The anode can be formed of a gel including zinc particles. The separator is disposed between the cathode and the anode. The alkaline electrolyte solution, which is dispersed throughout the battery, can be an aqueous hydroxide solution such as potassium hydroxide.

SUMMARY

An alkaline battery includes a cathode including a manganese dioxide having a spinel-type crystal structure (e.g., $\lambda\text{-MnO}_2$) and an anode including zinc. The alkaline battery can have an average closed circuit voltage of about 1.3V at low rates of discharge, adequate high-rate performance, and sufficient capacity retention when stored. The lambda-manganese dioxide can have a specific discharge capacity at low-rate (e.g., C/30 or 10 mA/g of active cathode material) to a 0.8V cutoff of greater than 310 mAh/g. An average closed circuit voltage of at least about 1.3V can provide voltage compatibility with commercial manganese dioxide-zinc primary alkaline batteries.

In one aspect, an alkaline battery includes a cathode including an active cathode material including lambda-manganese dioxide, an anode including zinc, a separator between the anode and the cathode, and an alkaline electrolyte contacting the anode and the cathode. The active cathode material has a specific discharge capacity to a 0.8V cutoff of greater than 290 mAh/g, greater than 300 mAh/g, greater than 310 mAh/g, or greater than 320 mAh/g, at a discharge rate corresponding to 20 mA/g or 10 mA/g of active cathode material.

In another aspect, a method of manufacturing an alkaline battery includes providing a positive electrode including an active cathode material including lambda-manganese oxide, and forming a battery including the electrode and a negative electrode including zinc particles. Providing the electrode includes preparing lambda-manganese dioxide by contacting water with a compound of the formula $Li_{1+x}Mn_{2-x}O_4$, wherein x is from −0.02 to +0.02 or from −0.005 to +0.005, adding an acid to the water and the compound to form a mixture until the mixture has a pH of 1 or less, separating a solid from the water and acid, and drying the solid, optionally in vacuo, at a temperature of 150° C. or below to obtain the lambda-manganese dioxide. The alkaline battery has a specific discharge capacity to a 0.8V cutoff of greater than 300 mAh/g at a discharge rate corresponding to 10 mA/g active cathode material.

The lambda-manganese dioxide can have a B.E.T. surface area of between 1 and 10 $m^2/g$ (e.g., greater than 8 $m^2/g$), a total pore volume of between 0.05 and 0.15 cubic centimeters per gram (e.g., 0.05 to 0.15 cubic centimeters per gram), or an average pore size of less than 100 Å. The acid can be sulfuric acid, nitric acid, perchloric acid, hydrochloric acid, toluene sulfonic acid, or trifluoromethyl sulfonic acid. Concentration of acid can be between 1 and 8 molar. The final pH can be 1 or less, 0.7 or less, or between 0.5 and 0.7. The method can include washing the solid separated from the water and acid with water until the washings have a pH of between 6 and 7.

The solid can be dried at a temperature between 20° C. and 120° C., between 30° C. to 90° C., or between 50° C. and 70° C.

Contacting water and the compound can include forming a slurry. The slurry can be maintained at a temperature between about 5° C. and 50° C. The temperature of the slurry can be maintained substantially constant during the addition of acid.

Other features and advantages of the invention will be apparent from the description and drawings, and from the claims.

DETAILED DESCRIPTION

Figure 1:
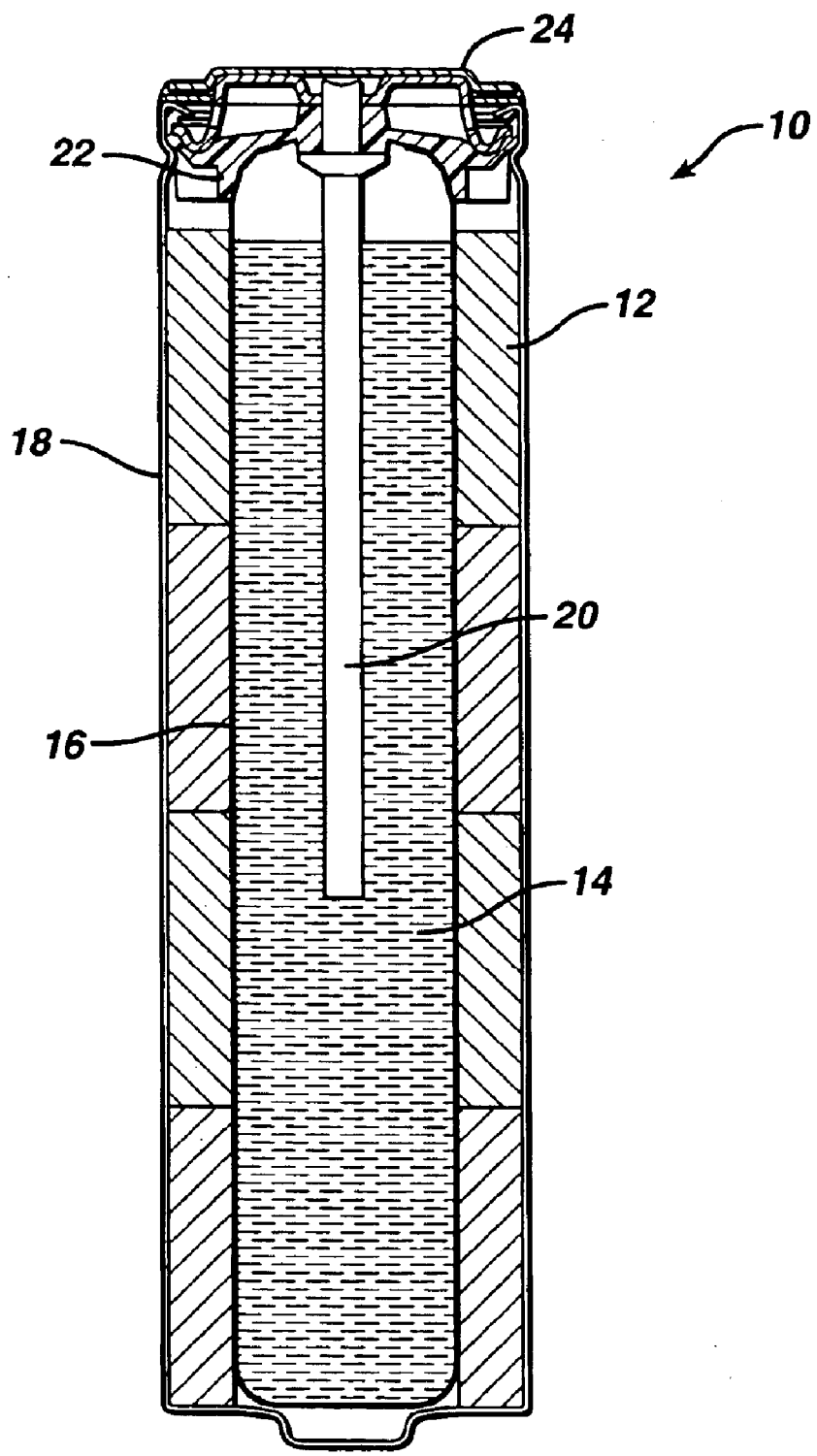
FIG. 1 is a cross-section view of a battery.

Referring to the FIG. 1, battery 10 includes a cathode 12 (positive electrode), an anode 14 (negative electrode), a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D battery.

Anode 14 can be formed of any of the standard zinc materials used in battery anodes. For example, anode 14 can be a zinc slurry that can include zinc metal particles, a gelling agent, and minor amounts of additives, such as a gassing inhibitor. In addition, a portion of the electrolyte solution can be dispersed throughout the anode.

The zinc particles can be any of the zinc particles conventionally used in slurry anodes. Examples of zinc particles can include those described in U.S. application Ser. No. 08/905,254, U.S. application Ser. No. 09/115,867, or U.S. application Ser. No. 09/156,915, each of which is hereby incorporated by reference in its entirety. The anode can include, for example, between 60 wt % and 80 wt %, between 65 wt % and 75 wt %, or between 67 wt % and 71 wt % of zinc particles.

The electrolyte can be an aqueous solution of alkali hydroxide, such as potassium hydroxide or sodium hydroxide. The electrolyte can contain between 15 wt % and 60 wt %, between 20 wt % and 55 wt %, or between 30 wt % and 50 wt % alkali hydroxide dissolved in water. The electrolyte can contain 0 wt % to 6 wt % alkali oxide, such as zinc oxide.

Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. Examples of a polyacrylic acid includes CARBOPOL 940 and 934 (available from B.F. Goodrich) and POLYGEL 4P (available from 3V), and an example of a grafted starch material includes WATERLOCK A221 or A220 (available from Grain Processing Corporation, Muscatine, Iowa). An example of a salt of a polyacrylic acid includes ALCOSORB G1 (available from Ciba Specialties). The anode can include, for example, between, between 0.05 wt % and 2 wt %, or between 0.1 wt % and 1 wt % gelling agent.

A gassing inhibitor can include an inorganic material, such as bismuth, tin, or indium. Alternatively, a gassing inhibitor can include an organic compound, such as a phosphate ester, an ionic surfactant or a nonionic surfactant. Examples of ionic surfactants are disclosed in, for example, U.S. Pat. No. 4,777,100, which is hereby incorporated by reference in its entirety.

Separator 16 can be a conventional battery separator. In some embodiments, separator 16 can be formed of two layers of non-woven, non-membrane material with one layer being disposed along a surface of the other. For example, to minimize the volume of separator 16 while providing an efficient battery, each layer of non-woven, non-membrane material can have a basic weight of about 54 grams per square meter, a thickness of about 5.4 mils when dry and a thickness of about 10 mils when wet. The layers can be substantially devoid of fillers, such as inorganic particles.

In other embodiments, separator 16 can include a layer of cellophane combined with a layer of non-woven material. The separator also can include an additional layer of non-woven material. The cellophane layer can be adjacent cathode 12 or the anode. The non-woven material can contain from 78 wt % to 82 wt % polyvinyl alcohol and from 18 wt % to 22 wt % rayon with a trace amount of a surfactant, such as non-woven material available from PDM under the trade name PA25.

Housing 18 can be a conventional housing commonly used in primary alkaline batteries. The housing can include an inner metal wall and an outer electrically non-conductive material such as a heat shrinkable plastic. Optionally, a layer of conductive material can be disposed between the inner wall and cathode 12. The layer can be disposed along the inner surface of the inner wall, along the circumference of cathode 12, or both. The conductive layer can be formed, for example, of a carbonaceous material (e.g., colloidal graphite), such as LB1000 (Timcal), Eccocoat 257 (W.R. Grace & Co.), Electrodag 109 (Acheson Colloids Company), Electrodag EB-009 (Acheson), Electrodag 112 (Acheson) and EB0005 (Acheson). Methods of applying the conductive layer are disclosed in, for example, Canadian Patent No. 1,263,697, which is hereby incorporated by reference in its entirety.

Current collector 28 can be made from a suitable metal, such as brass. Seal 30 can be made, for example, of a nylon.

Cathode 12 includes an active cathode material and conductive carbon particles. Optionally, cathode 12 can also include an oxidative additive, or a binder, or both. Generally, the cathode can include, for example, between 60% by weight and 97% by weight, between 80% by weight and 95% by weight, or between 85% by weight and 90% by weight of cathode material.

The conductive carbon particles can include graphite particles. The graphite particles can be synthetic graphite particles, including expanded graphite, non-synthetic, or natural graphite, or a blend thereof. Suitable graphite particles can be obtained from, for example, Brazilian Nacional de Grafite of Itapecerica, MG Brazil (e.g., NdG grade MP-0702X) Chuetsu Graphite Works, Ltd. (e.g., Chuetsu grades WH-20A and WH-20AF) of Japan or Timcal America of Westlake, Ohio (e.g., Timcal grade EBNB-90). The cathode can include, for example, between 2 wt % and 35 wt %, between 3 wt % and 10 wt %, or between 4 wt % and 8 wt % of carbon particles or blend of carbon particles.

Examples of binders can include a polymer such as polyethylene, polyacrylamide, or a fluorocarbon resin, such as PVDF or PTFE. An example of a polyethylene binder is sold under the trade name COATHYLENE HA-1681 (available from Hoechst). The cathode can include, for example, between 0.05 wt % and 5 wt %, or between 0.1 wt % and 2 wt % binder.

A portion of the electrolyte solution can be dispersed through cathode 12, and the weight percentages provided above and below are determined after the electrolyte solution has been dispersed.

The cathode material includes lambda-manganese dioxide ($\lambda$-$MnO_2$), which can be synthesized by an oxidative delithiation process from a lithium manganese oxide spinel precursor prepared by various synthetic methods and having a general composition $LiMn_2O_4$ and specific physical properties. A suitable lithium manganese oxide spinel precursor can be prepared as described in, for example, U.S. Pat. Nos. 4,246,253, 4,507,371, 4,828,834, 5,245,932, 5,425,932, 5,997,839, or 6,207,129, each of which is incorporated by reference in its entirety. More particularly, a lithium manganese oxide spinel precursor can have a formula of $Li_{1+x}Mn_{2-x}O_4$, where x is between −0.05 and +0.05, preferably between −0.02 and +0.02, more preferably between −0.005 and +0.005. Alternatively, lithium manganese oxide spinel can be obtained, for example, from Kerr-McGee Chemical Company, (Oklahoma City, Okla.), or Cams Chemical Company, (Peru, Ill.).

Physical, microstructural, and chemical properties for some commercial samples of $LiMn_2O_4$-type spinels obtained from several suppliers are summarized in Table 1. The x-ray powder diffraction (XRD) patterns for the $LiMn_2O_4$-type spinel powders were measured using a Rigaku Miniflex diffractometer using Cu $L_\alpha$ radiation. The spinel powder from Carus Chemical (Spinel B) has the largest refined cubic lattice cell constant, $a_o$, and also has a chemical composition very close to that for stoichiometric $LiMn_2O_4$ spinel. The reported (e.g., ICDD PDF No. 35-0782) cubic lattice constant for stoichiometric spinel is 8.248 Å. The other spinel $LiMn_2O_4$ powder from Kerr-McGee (Spinel A) has an XRD powder diffraction pattern that gives a refined lattice constant of 8.231 Å. This $a_0$ value is more consistent with those values typically reported for spinels having a slight excess lithium stoichiometry (i.e., $Li_{1+x}Mn_{2-x}O_4$, where x is between 0.005 and 0.1). The $a_0$ values for such spinels decrease linearly as x increases for x values between −0.15 and 0.25. See, for example, U.S. Pat. No. 5,425,932, which is incorporated by reference in its entirety.

The oxidative delithiation process can include, for example, the following steps:

1. A slurry of the precursor spinel powder is formed with stirring in distilled or deionized water and adjusted to a temperature between about 10 and 50° C., preferably between about 15° C. and 30° C.;

2. An aqueous solution of an acid, such as, for example, sulfuric acid, nitric acid, hydrochloric acid, perchloric acid, toluenesulfonic acid or trifluoromethylsulfonic acid, is added to the slurry with constant stirring at a rate to maintain a constant slurry temperature until the pH of the slurry stabilizes at a value typically below about 2, below about 1, or below about 0.7, but greater than about 0.5, and remains constant at this value for at least 0.75 hour (optionally, stirring can be continued for up to an additional 24 hours);

3. The solid product is separated from the supernatant liquid, for example, by suction, pressure filtration, or centrifugation, and is washed with aliquots of distilled or deionized water until the washings have a neutral pH (e.g., between about 6–7); and 4. The solid product is dried in vacuo for between 4 and 24 hours at 30 to 120° C., or at 50 to 90° C., or at 60° C. to 70° C.

After processing, the dried solid typically exhibits a weight loss of about 25 wt % relative to the initial weight of the precursor $LiMn_2O_4$ spinel powder. The total lithium content of the stoichiometric $LiMn_2O_4$ spinel is about 4.3 wt %. The observed weight loss can be attributed to the dissolution of lithium ions that migrated to the surface of the spinel particles as well as $Mn^{+2}$ ions from the $LiMn_2O_4$ spinel crystal lattice putatively resulting from a disproportionation reaction whereby $Mn^{+3}$ ions on the surface of the spinel particles are converted to insoluble $Mn^{+4}$ ions that remain on the surface and soluble $Mn^{+2}$ ions that dissolve in the acid solution according to Equation 1:

$$2LiMn^{+3}Mn^{+4}O_4 + 4H^+ \rightarrow 3\ \lambda\text{-}Mn^{+4}O_2 + Mn^{+2} + 2Li^+ + 2H_2O \qquad (1)$$

Figure 2:
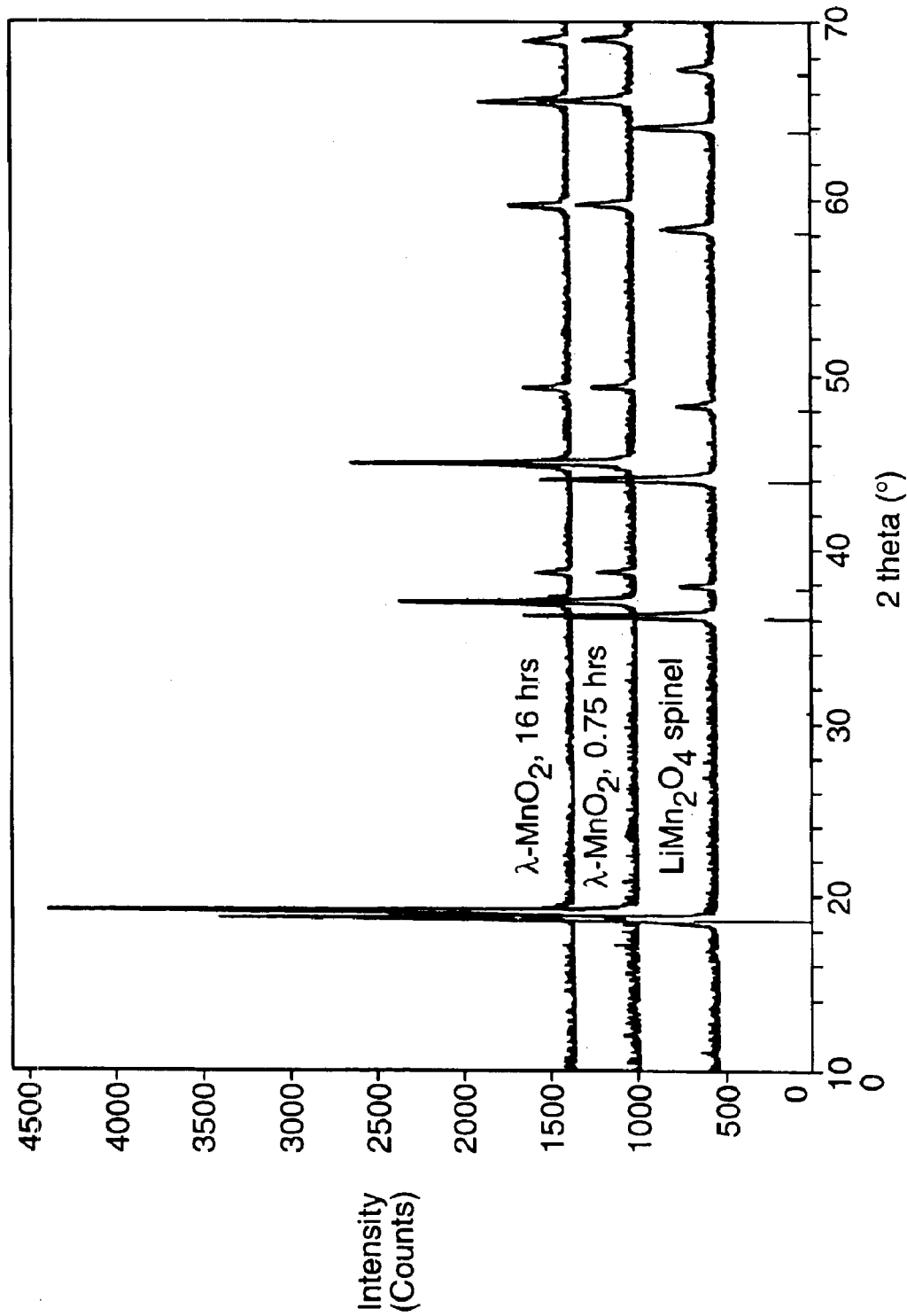
FIG. 2 is a graph depicting a comparison of x-ray powder diffraction patterns for $\lambda\text{-MnO}_2$ powders prepared from a stoichiometric $LiMn_2O_4$ spinel precursor.

The x-ray diffraction patterns for the $\lambda$-$MnO_2$ powders were measured using a Rigaku Miniflex diffractometer using Cu $K_\alpha$ radiation. The XRD powder patterns for the various dried $\lambda$-$MnO_2$ powders are consistent with that pattern reported for $\lambda$-$MnO_2$ (e.g.; ICDD PDF No. 44-0992). See, U.S. Pat. No. 4,246,253, which is incorporated by reference in its entirety. The lattice constants, $a_0$, for the refined cubic unit cells for the samples of $\lambda$-$MnO_2$ prepared by the method described above are given in Table 1. The $a_0$ values range between 8.035 and 8.048 Å. FIG. 2 is a graph depicting a comparison of x-ray powder diffraction patterns for $\lambda$-$MnO_2$ powders prepared by either 0.75 or 16 hours of acid treatment of a precursor spinel and the corresponding precursor spinel powder from Kerr-McGee having a nominal excess lithium stoichiometry of $Li_{1.05}Mn_{1.95}O_4$. The XRD powder pattern for $\lambda$-$MnO_2$ is distinguishable from that for the corresponding precursor spinel as shown in FIG. 2 for a sample of precursor spinel having a nominal excess lithium stoichiometry of $Li_{1.05}Mn_{1.95}O_4$ and the corresponding $\lambda$-$MnO_2$ acid-treated for either 0.75 or 16 hours by the shift in the positions of the diffraction peaks of the precursor spinel to higher $2\theta$ angles for the $\lambda$-$MnO_2$.

The precursor spinel can have a nominally stoichiometric composition, for example, a composition having the general formula $Li_{1+x}Mn_{2-x}O_4$, wherein x is from −0.02 to +0.02, such as $Li_{1.01}Mn_{1.99}O_4$, from which more complete delithiation can be accomplished, and in general, replacement of the lithium ions with protons by an ion-exchange reaction according to equation 2 can be reduced or avoided. It is thought that the presence of protons in lattice sites formerly occupied by the lithium ions can result in thermal instability and decreased discharge capacities for alkaline cells having cathodes including such materials.

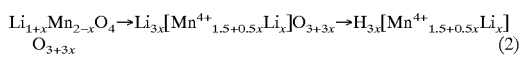

$$Li_{1+x}Mn_{2-x}O_4 \rightarrow Li_{3x}[Mn^{4+}{}_{1.5+0.5x}Li_x]O_{3+3x} \rightarrow H_{3x}[Mn^{4+}{}_{1.5+0.5x}Li_x]O_{3+3x} \qquad (2)$$

where 0.02<x<0.33

Specific surface areas of the various $\lambda$-$MnO_2$ powders as determined by multipoint nitrogen adsorption isotherms by the B.E.T. method as described by P. W. Atkins in "Physical Chemistry", 5$^{th}$ ed., New Your: W. H. Freeman & Co., 1994, pp. 990–2. B.E.T. surface area measurements were found to be substantially greater than those for the corresponding precursor spinel powders. See, Table 1. This increase in surface area is consistent with apparent increased roughness or porosity in the surface microstructure of the particles observed by comparing SEM micrographs (10,000×) of particles of the precursor spinel, for example, and particles of the corresponding $\lambda$-$MnO_2$. Further, porosimetric measurements on a precursor spinel powder and the corresponding $\lambda$-$MnO_2$ powder revealed that the total pore volume more than doubled after de-lithiation to $\lambda$-$MnO_2$ and that the average pore size decreased by nearly 80%.

TABLE 1

| Precursor Spinel | Spinel A | Spinel B |
|---|---|---|
| Lattice constant, $a_0$ Spinel (Å) | 8.231 | 8.242 |
| Lattice constant, $a_0$ $\lambda$-$MnO_2$ (Å) | 8.048 | 8.035 |
| B.E.T. SSA, Spinel (m²/g) | 0.44 | 3.43 |
| B.E.T. SSA, $\lambda$-$MnO_2$ (m²/g) | 4.98 | 8.30 |
| Average particle size, Spinel (μm) | 12 | 14.6 |
| Average Pore Size, Spinel (Å) | | 157 |
| Average Pore Size, $\lambda$-$MnO_2$ (Å) | | 36.5 |
| Total Pore Volume, Spinel (cc/g) | | 0.05 |
| $\lambda$-$MnO_2$ Total Pore Volume (cc/g) | | 0.11 |
| Tap Density, Spinel (g/cm³) | 2.10 | 2.08 |
| True Density, Spinel (g/cm³) | 4.225 | 4.196 |
| True Density, $\lambda$-$MnO_2$ (g/cm³) | 4.480 | 4.442 |
| Spinel Stoichiometry, $Li_{1+x}Mn_{2-x}O_4$, x = ? | 0.06–0.08 | 0.01 |

In certain embodiments, precursor spinels that permit preparation of $\lambda$-$MnO_2$ in accordance with the present invention can be selected according to the following selection criteria: (1) general chemical formula is $Li_{1+x}Mn_{2-x}O_4$ wherein x ranges from −0.05 to +0.05, preferably from −0.02 to +0.02, more preferably from −0.005 to +0.005; (2) B.E.T. surface area of the precursor spinel powder is between about 2 and 10 m²/g; (3) total pore volume of the precursor spinel powder is between about 0.02 and 0.1 cubic centimeters per gram; and (4) average pore size of the precursor spinel powder is between about 100 and 300 Å.

The thermal stability of the $\lambda$-$MnO_2$ powder prepared from Spinel B as described above was evaluated in order to determine the effects of various thermal treatments during cathode fabrication (e.g., drying, coating, pressing, etc.) on cell discharge performance. The XRD powder patterns for a sample of $\lambda$-$MnO_2$ powder heated in vacuo at 120° C. for 4 hours was found to be identical to that for a bulk sample of $\lambda$-$MnO_2$ powder originally dried in vacuo at 70° C. for up to 16 hours, indicating adequate thermal stability at this temperature. The XRD powder pattern for a sample of $\lambda$-$MnO_2$ powder heated in vacuo at 150° C. for 4 hours exhibited a slight broadening of the $\lambda$-$MnO_2$ peaks as well as the appearance of a new broad peak at a $2\theta$ angle of about 20° indicating the onset of decomposition of the $\lambda$-$MnO_2$ phase. Heating a sample of $\lambda$-$MnO_2$ powder in vacuo at 180° C. for 4 hours resulted in the complete disappearance of the characteristic $\lambda$-$MnO_2$ peaks and the appearance of several broad peaks in the XRD pattern suggesting the formation of one or more new phases. These poorly resolved new peaks can be attributed to the presence of $\beta$-$MnO_2$ and $\epsilon$-$MnO_2$ phases.

In addition to evaluating the thermal stability of the $\lambda$-$MnO_2$ powder, the thermal stability of $\lambda$-$MnO_2$ in pressed composite cathodes containing conductive carbon particles and a binder was evaluated. XRD patterns for pressed composite cathodes heated for 4 hours at 120° C. showed a broadening of the $\lambda$-$MnO_2$ peaks as well as the appearance of several new, broad, weak peaks attributed to the $\epsilon$-$MnO_2$ phase indicating the onset of decomposition of the $\lambda$-$MnO_2$ phase. Thus, $\lambda$-$MnO_2$ in the pressed composite cathode appears to start decomposing at an even lower temperature than λ-MnO$_2$ powder alone. In XRD patterns for cathodes heated at 150° C. or 180° C., all of the peaks attributed to the λ-MnO$_2$ phase disappeared completely, and only broad peaks characteristic of the ε-MnO$_2$ phase were present. Furthermore, unlike the case of λ-MnO$_2$ powder, no peaks for the β-MnO$_2$ phase could be discerned in the XRD pattern for a composite cathode heated at 180° C.

Batteries (button cells) including lambda-manganese dioxide in the cathode were prepared according to the following examples.

EXAMPLE 1

A sample of dried λ-MnO$_2$ powder was prepared as follows. Approximately 120 g of Spinel B, a nearly stoichiometric lithium manganese oxide spinel having a nominal composition of Li$_{1.01}$Mn$_{1.99}$O$_4$ (Carus Chemical Co.), was added with stirring to about 200 ml distilled water to form an aqueous slurry that was cooled to 15° C. 6M H$_2$SO$_4$ was added dropwise with constant stirring until the pH of the slurry stabilized at about 0.7. The slurry was stirred for an additional 20 hours at pH 0.7. The rate of acid addition was adjusted so as to maintain the temperature of the slurry at 15° C. The solid was separated from the liquid by either pressure or suction filtration through a non-woven, spun-bonded polyethylene film (Dupont, Tyvek) and washed with aliquots of distilled water until the washings had a neutral pH (e.g., a pH of about 6). The solid filtercake was dried in vacuo for 4–16 hours at 70° C. The weight of the dried λ-MnO$_2$ product was about 87 g, which corresponds to a weight loss of about 27.5%.

The λ-MnO$_2$ powder was blended manually using a mortar and pestle with natural graphite (Nacionale de Grafite, MP-0702X) and KOH electrolyte solution containing 38 wt % KOH and 2 wt % zinc oxide in a weight ratio of 60:35:5. About 0.5 g of this cathode mixture was pressed into a nickel wire grid welded to the bottom of a cathode can of a 635-type alkaline button cell. A polymeric insulating seal was inserted into the cathode can. A separator sheet in the form of a disk was saturated with electrolyte solution and placed on top of the cathode disk. Additional electrolyte solution was added by the application of a vacuum so that the electrolyte solution fully penetrated the separator sheet and wetted the cathode. A layer of anode mixture containing particulate zinc, electrolyte, and gelling agent was applied to the upper surface of the separator sheet. The anode can cover was positioned on top of the cell assembly and mechanically crimped to hermetically seal the cell.

The open circuit voltages for freshly assembled cells were measured and are given in Table 2. The cells were discharged at several different constant currents including 30 mA, 6 mA, and 3 mA, nominally corresponding to C/30, C/15 and C/3 discharge rates for Examples 1a, 1b and 1c, respectively. For example, a C/30 rate corresponds to that discharge rate at which the cell capacity was discharged in a period of 30 hours. The C/30, C/15, and C/3 discharge rates further correspond to 10 mA/g, 20 mA/g and 100 mA/g of active cathode material. The gravimetric discharge capacities for cells discharged continuously at each of the constant currents to cutoff voltages of 1V and 0.8V also are given in Table 2. The values of capacities to 0.8V obtained for the C/30 and C/15 rates were quite similar but were about 10 to 15% greater than those obtained for comparable cells having cathodes containing EMD (see Comparative Example 1) instead of λ-MnO$_2$ and discharged at corresponding rates as shown in FIG. 3.

COMPARATIVE EXAMPLE 1

EMD (Kerr-McGee, Trona D) powder was blended manually using a mortar and pestle with natural graphite (Nacionale de Grafite, MP-0702X) and 38% KOH electrolyte solution in a weight ratio of 60:35:5. About 0.5 g of this cathode mix was pressed into a cathode disk in the bottom of the cathode can of a 635-type alkaline button cell. Button cell assembly was completed as described in Example 1. The open circuit voltages for freshly assembled cells were measured and are given in Table 2. The cells were discharged at several different constant currents including 30 mA, 6 mA, and 3 mA, nominally corresponding to C/3, C/15 and C/30 discharge rates, respectively. The gravimetric discharge capacities for cells discharged at each of the above constant currents to cutoff voltages of 1V and 0.8V are given in Table 2. Discharge capacities to 0.8V of 282 mAh/g and 266 mAh/g were obtained for button cells discharged at C/30 (FIG. 3) and C/15 rates, respectively. However, cells discharged at the C/3 rate to a 0.8V cutoff gave considerably lower capacities of 215 mAh/g.

Figure 3:
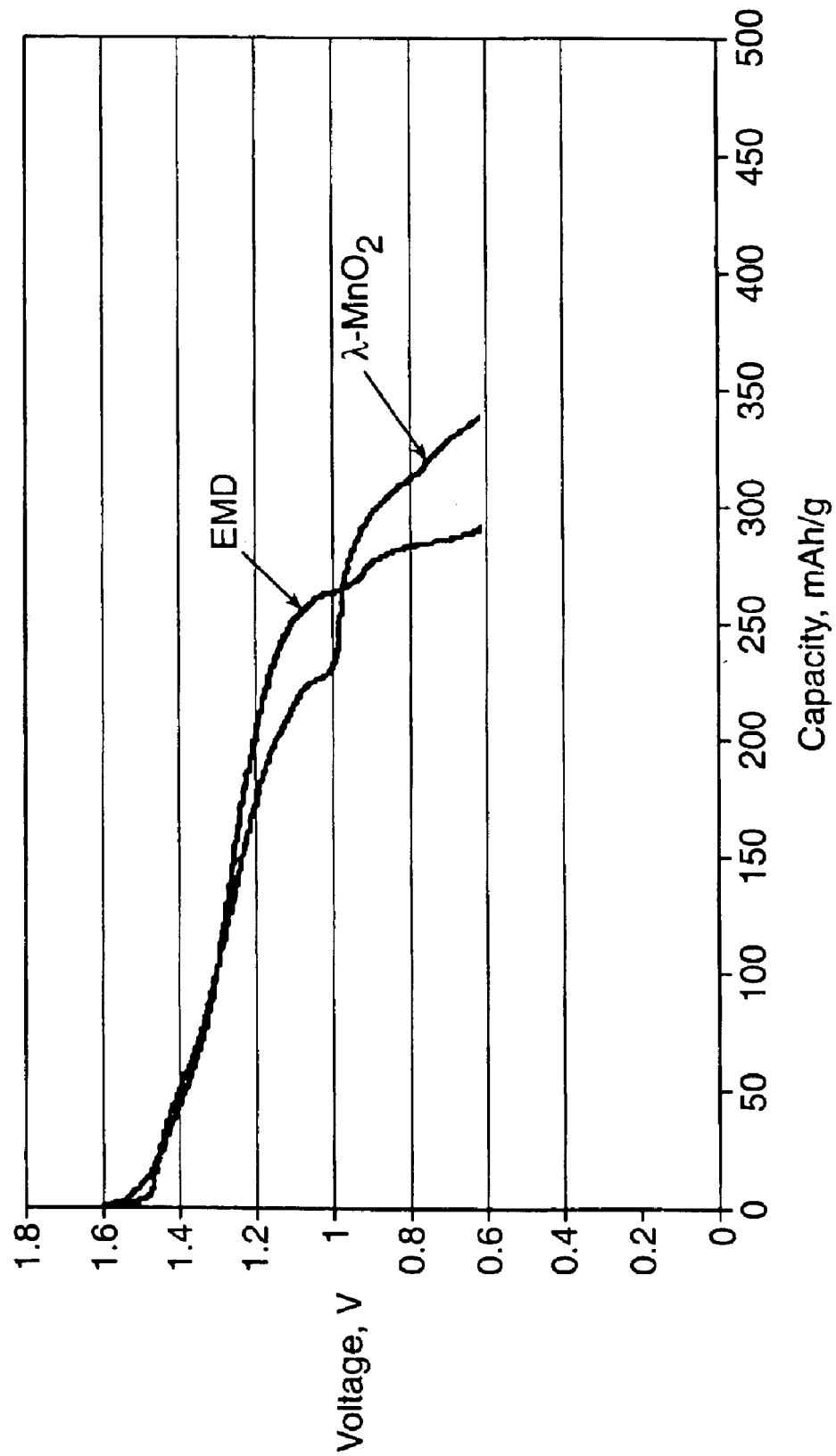
FIG. 3 is a graph depicting the discharge performance of alkaline button cells with cathodes containing either $\lambda\text{-MnO}_2$ or a commercial electrolytic manganese dioxide (EMD) discharged at a rate of C/30 or 10 mA/g of active cathode material to a 0.6V cutoff.

The averaged discharge curve for cells of Example 1 discharged at a C/30 rate is compared with the corresponding curve for cells of Comparative Example 2 having cathodes containing commercial EMD (e.g., Kerr-McGee, "Trona D") in FIG. 3. The profiles of the discharge curves for cells with cathodes containing λ-MnO$_2$ exhibit an elongated discharge plateau at about 0.95 to 1V that can be attributed to the reduction of Mn$^{+3}$ ions by a second electron to Mn$^{+2}$.

COMPARATIVE EXAMPLE 2

A sample of dried λ-MnO$_2$ powder was prepared as described in Example 1, but with Spinel A (Kerr-McGee, Grade LMO-210) substituted for Spinel B. The λ-MnO$_2$ powder was blended either manually using a mortar and pestle or mechanically using a high-speed laboratory mixer mill (e.g., Waring mixer) with natural graphite (Nacionale de Grafite, MP-0702X) and 38% KOH electrolyte solution in a weight ratio of 60:35:5.

Button cells having cathodes containing this cathode mix were fabricated in the same manner as in Example 1. The open circuit voltages for freshly assembled cells were measured and are given in Table 2. The cells were discharged at constant currents of 30 mA (Comparative Example 2a) and 6 mA (Comparative Example 2b) corresponding to C/3 and C/15 discharge rates, respectively. The gravimetric discharge capacities for cells discharged continuously at each of the rates to cutoff voltages of 1V and 0.8V also are given in Table 2. The values obtained for capacities to a 1V cutoff at both discharge rates were typically less than those for comparable cells of Example 1 having cathodes containing λ-MnO$_2$ prepared from Spinel B and discharged at corresponding rates. The capacity of cells discharged to a 0.8V cutoff at a C/15 rate also was somewhat lower for cells having cathodes containing the λ-MnO$_2$ prepared from Spinel A.

TABLE 2

| Ex. No. | Cathode Matl | Vacuum Filled | Discharge Rate | Ave OCV (V) | Capacity to 1 V (mAh/g) | Capacity to 0.8 V (mAh/g) |
|---|---|---|---|---|---|---|
| C1b | EMD | No | C/15 | 1.60 | 245 | 266 |
| C2b | λ-MnO$_2$ | No | C/15 | 1.69 | 204 | 290 |
| 1b | λ-MnO$_2$ | No | C/15 | 1.65 | 220 | 302 |
| 1d | λ-MnO$_2$ | Yes | C/15 | 1.68 | 206 | 289 |
| C1a | EMD | No | C/30 | 1.61 | 262 | 282 |
| 1a | λ-MnO$_2$ | No | C/30 | 1.65 | 233 | 312 |
| C1c | EMD | No | C/3 | 1.6 | 164 | 215 |
| C2a | λ-MnO$_2$ | No | C/3 | 1.69 | 159 | 218 |
| 1c | λ-MnO$_2$ | No | C/3 | 1.66 | 167 | 187 |

The average OCV values for cells containing λ-MnO$_2$ prepared from the Spinels A and B ranged from 1.64 to 1.69

V compared to a value of about 1.60 to 1.62 V for cells containing a commercial EMD (e.g., Kerr-McGee Trona D EMD). The discharge capacities to 1V and 0.8V cutoffs are shown in Table 2. The values given are the averages for 4–5 individual button cells. The capacity to a 0.8 V cutoff for cells with cathodes containing $\lambda$-$MnO_2$ prepared from Spinel B discharged at a C/30 rate was nearly 110% that for button cells with cathodes containing commercial EMD to a 0.8 V cutoff. Further, the discharge capacity to a 0.8 V cutoff for cells with cathodes containing $\lambda$-$MnO_2$ prepared from Spinel B discharged at a C/15 rate was nearly 113% that for cells with cathodes containing commercial EMD. However, the discharge capacity to a 0.8V cutoff for cells with cathodes containing $\lambda$-$MnO_2$ prepared from Spinel A discharged at a C/15 rate was about 110% that for cells with cathodes containing EMD and only about 95% for cells with cathodes containing $\lambda$-$MnO_2$ prepared from Spinel B. The capacity to a 0.8 V cutoff for cells with cathodes containing $\lambda$-$MnO_2$ prepared from Spinel A discharged at a C/3 rate was nearly identical to that for cells with cathodes containing commercial EMD.

Figure 4:
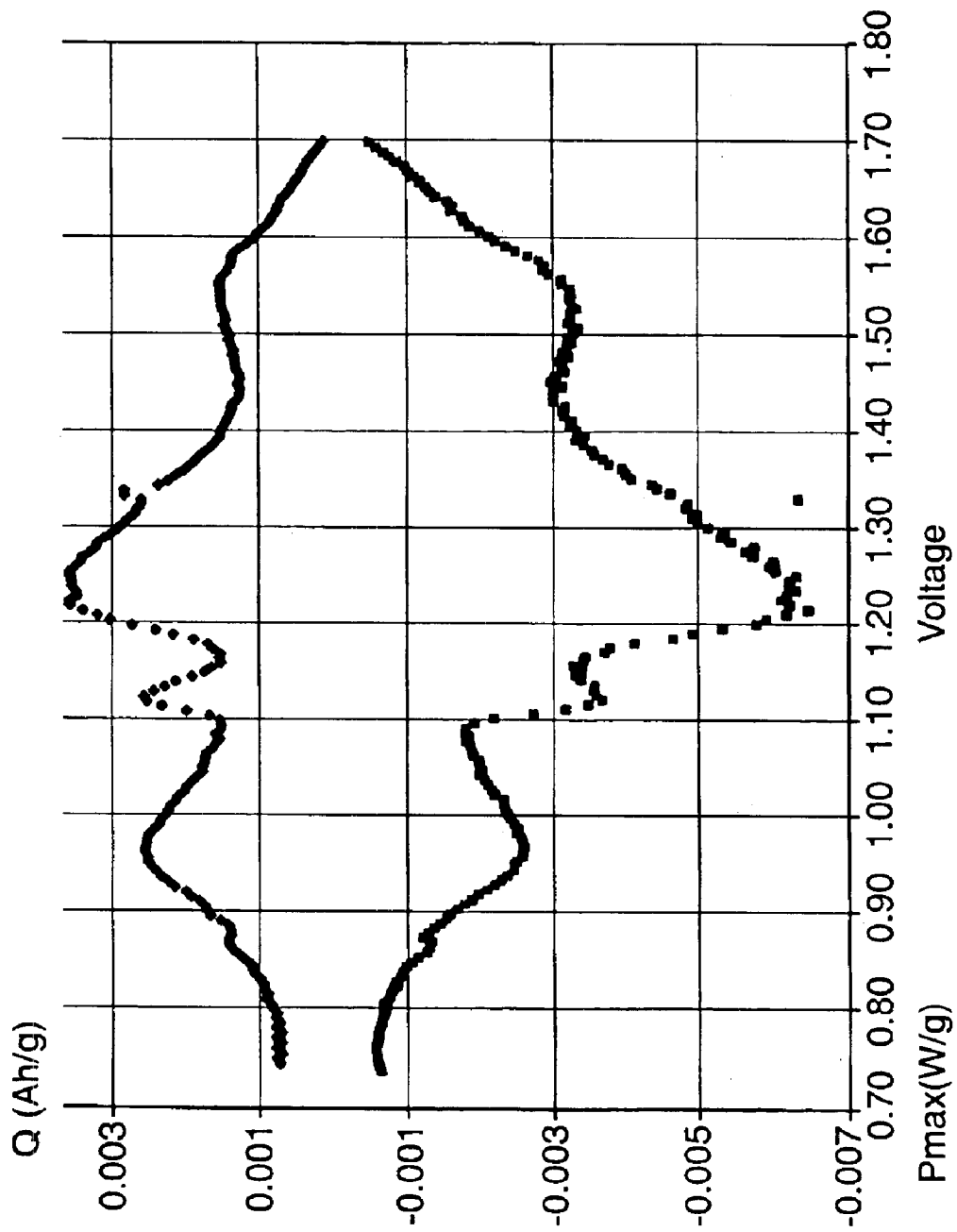
FIG. 4 is a graph depicting the incremental discharge capacity and maximum power, determined by Stepped Potential Electro-Chemical Spectroscopy (SPECS) for an alkaline button cell having a cathode including $\lambda\text{-MnO}_2$.
Figure 5:
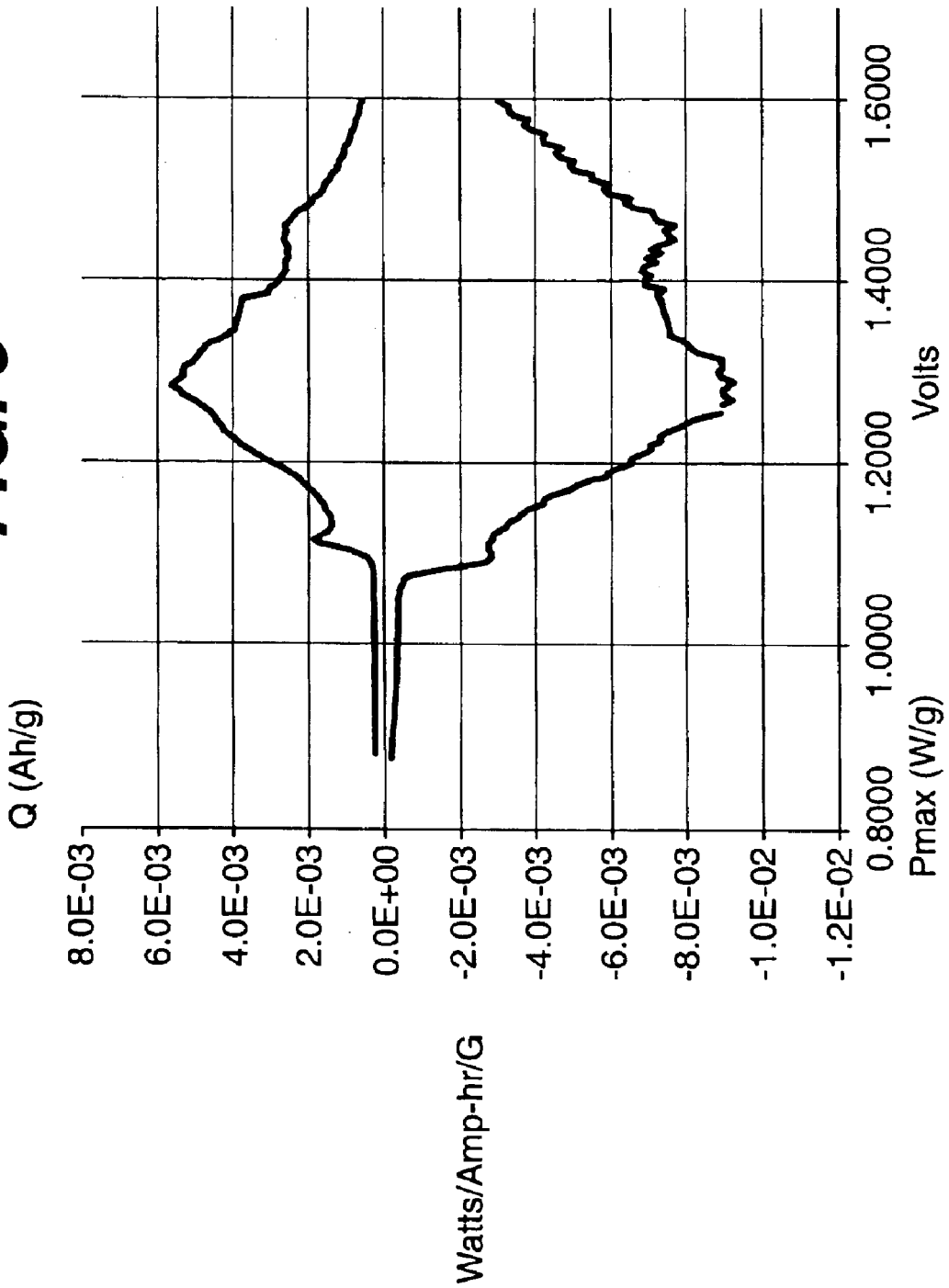
FIG. 5 is a graph depicting the incremental discharge capacity and maximum power, determined by Stepped Potential Electro-Chemical Spectroscopy (SPECS) for an alkaline button cell having a cathode including a commercial EMD.

The incremental discharge capacity and maximum power, $P_{max}$, for an alkaline button cell having a cathode containing $\lambda$-$MnO_2$ of Example 1 were determined for a cell discharged to a cutoff of about 0.75V by SPECS and the results depicted in FIG. 4. The Stepped Potential Electro-Chemical Spectroscopy (viz., SPECS) method has been disclosed in ITE Letters on Batteries, Vol. 1, No. 6, 2000, pp. 53–64, which is incorporated herein by reference in its entirety. Although the peaks centered at about 1.25V and 1.12V are observed commonly for commercial EMD materials, the additional broad peaks centered at about 1.55V and 0.95V in both curves denote the contributions of incremental capacity and maximum power from discharge processes that typically are not observed for a commercial EMD. The incremental discharge capacity and maximum power for an alkaline button cell (Comparative Example 1) discharged to a cutoff of about 0.9V with a cathode containing commercial EMD from Kerr-McGee (e.g., Trona-D) also were determined by SPECS and the results depicted in FIG. 5. By comparison, the commercial EMD exhibited broad peaks near 1.45V and 1.3V and the absence of the peaks near 1.55V and 0.95V that are characteristic of $\lambda$-$MnO_2$. Thus, the presence of these latter peaks indicate the particular suitability of the $\lambda$-$MnO_2$ cathode material of this invention for use in high-energy, high-capacity primary alkaline cells.

Furthermore, the broad peaks near 0.95V in both the incremental capacity and the maximum power plots for a typical commercial EMD (See FIG. 5) can be attributed to the further reduction of groutite, $\alpha$-MnOOH, the initial one-electron reduction product, to the final two-electron reduction product, pyrochroite, $Mn(OH)_2$. The electrochemical two electron reduction of $\gamma$-$MnO_2$ to $Mn(OH)_2$ has been studied extensively (See, for example, A. Kozawa, in "Batteries, Vol. 1, Manganese Dioxide," K. V. Kordesch, ed., New York: Marcel Dekker, Inc., 1974, pp. 385–515) and has been shown to proceed by a two step reduction process involving an initial solid state proton insertion during the first electron reduction followed by dissolution and precipitation during the second electron reduction (See, R. Patrice et al., ITE Batteries, Vol. 2, No. 4, 2001, ppB6–14). Further, it was revealed that $\gamma$-$MnO_2$ provides very little discharge capacity from the second electron reduction in alkaline cells having relatively low levels of conductive carbon particles in the cathode, carbon particles with low surface area, high concentrations of KOH in the electrolyte solution or zinc oxide present in the electrolyte. As a result, the reduction of groutite to pyrochroite typically is disfavored for consumer manganese dioxide/zinc alkaline primary cells and thus, very little additional discharge capacity is obtained below about 0.9V. Under identical discharge conditions, cells having cathodes containing $\lambda$-$MnO_2$ provide substantial additional capacity at about 0.95V as shown in the incremental capacity plot in FIG. 4. In fact, a quantitative study of this incremental capacity plot reveals the specific capacity of the $\lambda$-$MnO_2$ of Example 1 is about 220 mAhr/g before including the contribution of the additional capacity resulting from the second electron reduction process at 0.95V and about 320 mAhr/g when it is included. This represents a contribution of about 100 mAhr/g or about 30% of the total discharge capacity that can be attributed directly to the second electron reduction process in the case of cells containing $\lambda$-$MnO_2$. However, the detailed reaction mechanism for the electrochemical two-electron reduction process for $\lambda$-$MnO_2$ has not yet been determined.

EXAMPLE 2

A sample of dried $\lambda$-$MnO_2$ powder was prepared as described in Example 1. The $\lambda$-$MnO_2$ powder was blended using a high-speed laboratory mixer mill (e.g., Waring mixer) with a natural graphite (Nacionale de Grafite, MP-0702X) and 38% KOH electrolyte solution in a weight ratio of 87:8:5.

Button cells having cathodes containing this cathode mix were fabricated in the same manner as in Example 1. The open circuit voltages for freshly assembled cells were measured and are listed in Table 3. The cells were discharged at constant currents of 3 mA (Example 2a) and 30 mA (Example 2b) corresponding to C/40 and C/4 discharge rates, respectively. The C/40 and C/4 discharge rates correspond to 7 mA/g of active cathode material and 70 mA/g of active cathode material. The gravimetric discharge capacities for cells discharged continuously at each of the constant current values to cutoff voltages of 1V and 0.8V also are given in Table 3. The values of capacities to 1V obtained for both discharge rates were nearly identical to those obtained for comparable cells having cathodes containing EMD instead of $\lambda$-$MnO_2$ and discharged at corresponding rates. The values of capacities for cells discharged to 0.8V at both rates were slightly lower than those obtained for comparable cells having cathodes containing EMD instead of $\lambda$-$MnO_2$ (See Comparative Example 2).

EXAMPLE 3

A sample of dried $\lambda$-$MnO_2$ powder was prepared as described in Example 1. The $\lambda$-$MnO_2$ powder was blended using a high-speed laboratory mixer mill (e.g., Waring mixer) with an admixture containing a 1:1 weight ratio of a natural graphite (Nacionale de Grafite, MP-0702X) and an expanded graphite (Timcal, EBNB-90) and 38% KOH electrolyte solution in an overall weight ratio of 87:4:4:5.

Button cells having cathodes containing this cathode mix were fabricated in the same manner as in Example 1. The open circuit voltages for freshly assembled cells were measured and are listed in Table 3. The cells were discharged at constant currents of 3 mA (Example 3a) and 30 mA (Example 3b) corresponding to C/40 and C/4 discharge rates, respectively. The C/40 and C/4 discharge rates correspond to 7 mA/g of active cathode material and 70 mA/g of active cathode material. The gravimetric discharge capacities for cells discharged continuously at each of the constant current values to cutoff voltages of 1V and 0.8V also are given in Table 3. The average capacity for cells discharged to 0.8V at a C/40 rate was about 111% that for comparable cells having cathodes containing EMD instead of $\lambda$-$MnO_2$ and discharged at the same rate (see Comparative Example 2).

COMPARATIVE EXAMPLE 3

EMD (Kerr-McGee Trona D) powder was blended using a high-speed laboratory mixer mill (e.g., Waring mixer) with an admixture containing a 1:1 weight ration of a natural graphite (Nacionale de Grafite, MP-0702X) and an expanded graphite (Timcal, EBNB-90) and 38% KOH electrolyte solution in an overall weight ratio of 87:4:4:5.

Button cells were fabricated as in Example 1. The open circuit voltages for freshly assembled cells were measured and are listed in Table 3. The cells were discharged at constant currents of 3 mA (Comparative Example 3a) and 30 mA (Comparative Example 3b) corresponding to C/40 and C/4 discharge rates, respectively. The gravimetric discharge capacities for cells discharged continuously at each of the constant current values to cutoff voltages of 1V and 0.8V are given in Table 3.

TABLE 3

| Example No. | Active Cathode Matl | Total Graphite Level (wt %) | Discharge Rate | Ave OCV (V) | Capacity to 1 V (mAh/g) | Capacity to 0.8 V (mAh/g) |
|---|---|---|---|---|---|---|
| C3a | EMD | 4 + 4 | C/40 | 1.62 | 207 | 237 |
| 3a | $\lambda$-MnO$_2$ | 4 + 4 | C/40 | 1.71 | 203 | 263 |
| 2a | $\lambda$-MnO$_2$ | 8 | C/40 | 1.73 | 196 | 220 |
| C3b | EMD | 4 + 4 | C/4 | 1.62 | 144 | 156 |
| 2b | $\lambda$-MnO$_2$ | 4 + 4 | C/4 | 1.73 | 125 | 130 |
| 3b | $\lambda$-MnO$_2$ | 8 | C/4 | 1.73 | 142 | 146 |

A number of embodiments of the invention have been described. Nevertheless, it will be understood that various modifications may be made without departing from the spirit and scope of the invention. For example, oxidative delithiation of the precursor spinel can be performed using a variety of aqueous oxidizing agents including, for example, an aqueous solution of sodium or potassium peroxydisulfate, sodium or potassium peroxydiphosphate, sodium perborate, sodium or potassium chlorate, sodium or potassium permanganate, cerium (+4) ammonium sulfate or nitrate, or sodium perxenate, or ozone gas bubbled through acidic water. Non-aqueous oxidizing agents include, for example, nitrosonium or nitronium tetrafluoroborate in acetonitrile, nitrosonium or nitronium hexafluorophosphate in acetonitrile, or oleum (i.e., SO$_3$/H$_2$SO$_4$) in sulfolane. Using an aqueous chemical oxidant such as peroxydisulfate, ozone or a non-aqueous oxidizing agent to oxidize the Mn$^{+3}$ ions to Mn$^{+4}$ ions in the LiMn$_2$O$_4$ spinel can result in substantially less manganese being lost by dissolution than in the disproportionation process (Equation 1) taking place during treatment with an aqueous acid solution.

Other embodiments are within the claims.

What is claimed is:

1. A method of manufacturing an alkaline battery comprising:
    providing a positive electrode including an active cathode material including lambda-manganese oxide; and
    forming a battery including the positive electrode and a zinc electrode,
    wherein the active cathode material has a specific discharge capacity to a 0.8V cutoff of greater than 300 mAh/g at a discharge rate of 20 mA/g of active cathode material.

2. A method of manufacturing an alkaline battery, the method comprising:
    providing a positive electrode including an active cathode material including lambda-manganese oxide, wherein providing the electrode includes preparing lambda-manganese dioxide by a method comprising:
        contacting water with a compound of the formula Li$_{1+x}$Mn$_{2-x}$O$_4$, wherein x is from −0.02 to +0.02;
        adding an acid to the water and compound until the water has a pH of 1 or less;
        separating a solid from the water and acid; and
        drying the solid at a temperature of 120° C. or below to obtain the lambda-manganese dioxide; and
    forming a battery including the positive electrode and a zinc electrode,
    wherein the active cathode material has a specific discharge capacity to a 0.8V cutoff of greater than 300 mAh/g at a discharge rate of 20 mA/g of active cathode material.

3. The method of claim 2, wherein the compound has a B.E.T. surface area of between 1 and 10 m$^2$/g.

4. The method of claim 2, wherein the compound has a total pore volume of between 0.05 and 0.15 cubic centimeters per gram.

5. The method of claim 2, wherein the compound of the formula Li$_{1+x}$Mn$_{2-x}$O$_4$ has a spinel-type crystal structure.

6. The method of claim 2, wherein the solid is dried at a temperature of less than about 100° C.

7. The method of claim 2, wherein the solid is dried at a temperature between 50° C. and 70° C.

8. The method of claim 2, wherein x is from −0.005 to +0.005.

9. The method of claim 2, wherein contacting water and the compound includes forming a slurry.

10. The method of claim 9, wherein the slurry is maintained at a temperature below 50° C.

11. The method of claim 9, wherein the temperature of the slurry is maintained substantially constant during the addition of acid.

12. The method of claim 2, wherein the acid concentration is between 1 and 8 molar.

13. The method of claim 2, wherein the acid is sulfuric acid, nitric acid, perchloric acid, hydrochloric acid, toluene sulfonic acid, or trifluoromethyl sulfonic acid.

14. The method of claim 2, wherein the pH is 1 or less.

15. The method of claim 2, further comprising washing the solid separated from the water and acid with water until the washings have a pH greater than 6.

* * * * *